(12) United States Patent
Lou (10) Patent No.: US 7,156,399 B2
(45) Date of Patent: Jan. 2, 2007

(54) SEALING DEVICE AND SLIDING MEMBER (75) Inventor: Liming Lou, Yamatokoriyama (JP)

(73) Assignee: Koyo Seiko Co., Ltd., Osaka (JP)

(*) Notice: Subject to any disclaimer, the term of this patent is extended or adjusted under 35 U.S.C. 154(b) by 0 days.

(21) Appl. No.: 10/606,766

(22) Filed: Jun. 27, 2003

(65) Prior Publication Data
US 2004/0004326 A1   Jan. 8, 2004

(30) Foreign Application Priority Data

Jul. 2, 2002   (JP) ............... 2002-193507
Aug. 22, 2002  (JP) ............... 2002-241599

(51) Int. Cl.
F16J 15/32   (2006.01)
F16J 9/20    (2006.01)

(52) U.S. Cl. .............. 277/436; 277/549; 277/552
(58) Field of Classification Search ........ 277/434–437, 277/549, 552, 559, 399–400
See application file for complete search history.

(56) References Cited

U.S. PATENT DOCUMENTS

| | | | | |
|---|---|---|---|---|
| 2,489,715 A | | 11/1949 | Clayton, Jr. et al. | |
| 3,586,340 A | * | 6/1971 | Otto et al. ............ | 277/400 |
| 3,620,540 A | * | 11/1971 | Jagger et al. .......... | 277/559 |
| 3,973,781 A | * | 8/1976 | Grorich ............... | 277/559 |
| 4,118,856 A | * | 10/1978 | Bainard et al. ........ | 29/511 |
| 5,899,461 A | | 5/1999 | Yomogita | |
| 6,481,720 B1 | * | 11/2002 | Yoshida et al. ........ | 277/400 |
| 6,494,462 B1 | * | 12/2002 | Dietle ................ | 277/549 |
| 6,592,337 B1 | * | 7/2003 | Yamada et al. ......... | 417/222.2 |
| 2003/0178781 A1 | * | 9/2003 | Tejima ............... | 277/399 |

FOREIGN PATENT DOCUMENTS

| | | |
|---|---|---|
| DE | 37 02 018 C1 | 11/1987 |
| JP | 53-152053 | 5/1978 |
| JP | 2-136858 | 11/1990 |
| JP | 5-8159 | 2/1993 |
| JP | 9-210088 | 8/1997 |
| JP | 09-210088 | 8/1997 |
| JP | 2001-208210 | 8/2001 |
| WO | WO 00/65258 | 11/2000 |

* cited by examiner

Primary Examiner—Vishal Patel
(74) Attorney, Agent, or Firm—Rabin & Berdo, PC (57) ABSTRACT A sealing device comprises a sealing member brought into contact with a contact surface so as to be slidable in a predetermined sliding direction. The sealing member comprises a sliding contact portion containing a high polymer material to be brought into sliding contact with the contact surface. A plurality of recessed or protruding streaks, which are independent of one another, are provided side by side so as to constitute a column on a surface of the sliding contact portion.

36 Claims, 10 Drawing Sheets

SEALING DEVICE AND SLIDING MEMBER

BACKGROUND OF THE INVENTION

1. Field of the Invention

The present invention relates to a sealing device and a sliding member.

2. Description of Related Arts

To make sliding resistance between two objects which slide over each other as low as possible is an extremely important objective to mechanical components such as a bearing and a seal. The reason for this is that it can not only contribute to the improvement in the life of the mechanical components but also restrains the loss of energy.

Conventionally, a surface of a sliding portion has been coated with fluorocarbon resin which is a low friction resin. However, the fabrication cost is increased. Further, a lubricant such as grease or lubricating oil has been interposed between two objects. However, the lubricant may, in some cases, run out. Therefore, there is a limit to the reduction in sliding resistance.

Meanwhile, in a sliding portion constructed using a high polymer material, sliding resistance is generally liable to be increased. A sealing device for sealing a space between a rotating axis and a housing and a space between a reciprocating axis and the housing, for example, has a sliding portion composed of a rubber material which slides to and from the rotating axis and the reciprocating axis. However, the sliding resistance may, in some cases, be increased by running out of an oil film of the sliding portion.

In one, used for a clutch in an automatic transmission of an automobile, for example, of the above-mentioned sealing devices, an annular sealing member made of rubber is generally provided on the inner periphery and the outer periphery of a piston member, and a surface of the sealing member is provided with a lip serving as a sliding portion brought into contact with the housing. Consequently, a space between the housing and the piston member is sealed.

Conventionally, the lip of the sealing member has its whole sliding surface brought into contact with the housing or the like, so that the sliding resistance is high. Moreover, sealing members are respectively provided on the inner periphery and the outer periphery of the annular piston member. Accordingly, the response characteristics of the operation of the piston member are poor.

On the other hand, a sealing device in which a sliding surface of a lip is provided with an annular projection or the like along its circumference has been proposed (e.g., JP-A-9-210088) for the purpose of reducing sliding resistance. However, the sliding resistance is not sufficiently reduced.

SUMMARY OF THE INVENTION

An object of the present invention is to further reduce sliding resistance in a sealing device and a sliding member.

In order to attain the above-mentioned object, in a preferred mode of the present invention, a sealing device comprises a sealing member brought into contact with a contact surface so as to be slidable in a predetermined sliding direction. The sealing member comprises a sliding contact portion containing rubber or synthetic resin to be brought into sliding contact with the contact surface, and a plurality of recessed or protruding streaks, which are independent of one another, provided side by side so as to constitute a column on a surface of the sliding contact portion.

In the present mode, a lubricant stored in the recessed or protruding streaks is sufficiently supplied to the sliding contact portion as the sliding contact portion in the sealing member slides relative to the contact surface, thereby making it possible to significantly reduce sliding resistance. Further, the contact area of the sliding contact portion with the contact surface is reduced, thereby making it possible to significantly reduce the sliding resistance.

In another preferred mode of the present invention, a sliding member brought into contact with a contact surface so as to be slidable in a predetermined sliding direction comprises a sliding contact portion containing a high polymer material to be brought into sliding contact with the contact surface, and a plurality of recessed or protruding streaks, which are independent of one another, provided side by side so as to constitute a column on a surface of the sliding contact portion.

In the sliding contact portion containing a high polymer material, sliding resistance is liable to be increased. In the present mode, a lubricant stored in the plurality of recessed or protruding streaks which are independent of one another is sufficiently supplied to the sliding portion as the sliding member slides relative to the contact portion, thereby making it possible to significantly reduce the sliding resistance. Further, the contact area of the sliding contact surface is reduced, thereby making it possible to significantly reduce the sliding resistance.

DETAILED DESCRIPTION OF THE PREFERRED EMBODIMENT

Referring now to the drawings, an embodiment of the present invention will be specifically described.

Referring to FIGS. 1 to 4, an embodiment of the present invention will be described.

Figure 1:
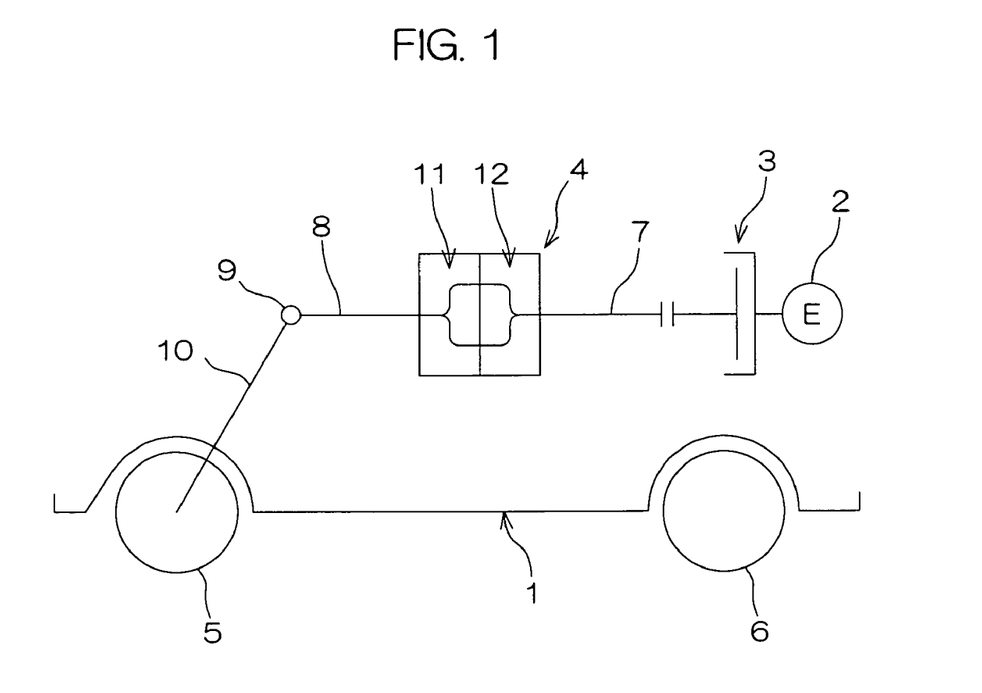
FIG. 1 is a schematic view showing the schematic construction of an automobile to which a sealing device according to an embodiment of the present invention is applied.

First referring now to FIG. 1, an automobile 1 comprises a power source 2 such as an engine, an automatic transmission 4 communicated to the power source 2 through a torque converter 3, a driving wheel 5 to which power from the automatic transmission 4 is transmitted, and a wheel 6. The automatic transmission 4 decelerates the rotation of the power source 2 and transmits the decelerated rotation to the driving wheel 5. An input shaft 7 of the automatic transmission 4 is connected to the power source 2 through the torque converter 3 so as to be power transmittable. Further, an output shaft 8 is connected to the driving wheel 5 through a joint 9, a transmission shaft 10, and so on so as to be power transmittable.

The automatic transmission 4 has the input shaft 7, the output shaft 8, a transmission mechanism 11 interposed between the input shaft 7 and the output shaft 8 for transmitting power, and a clutch 12 provided in the transmission mechanism 11. By the operation of the clutch 12, power from the input shaft 7 to the transmission mechanism 11 can be transmitted or interrupted.

Figure 2:
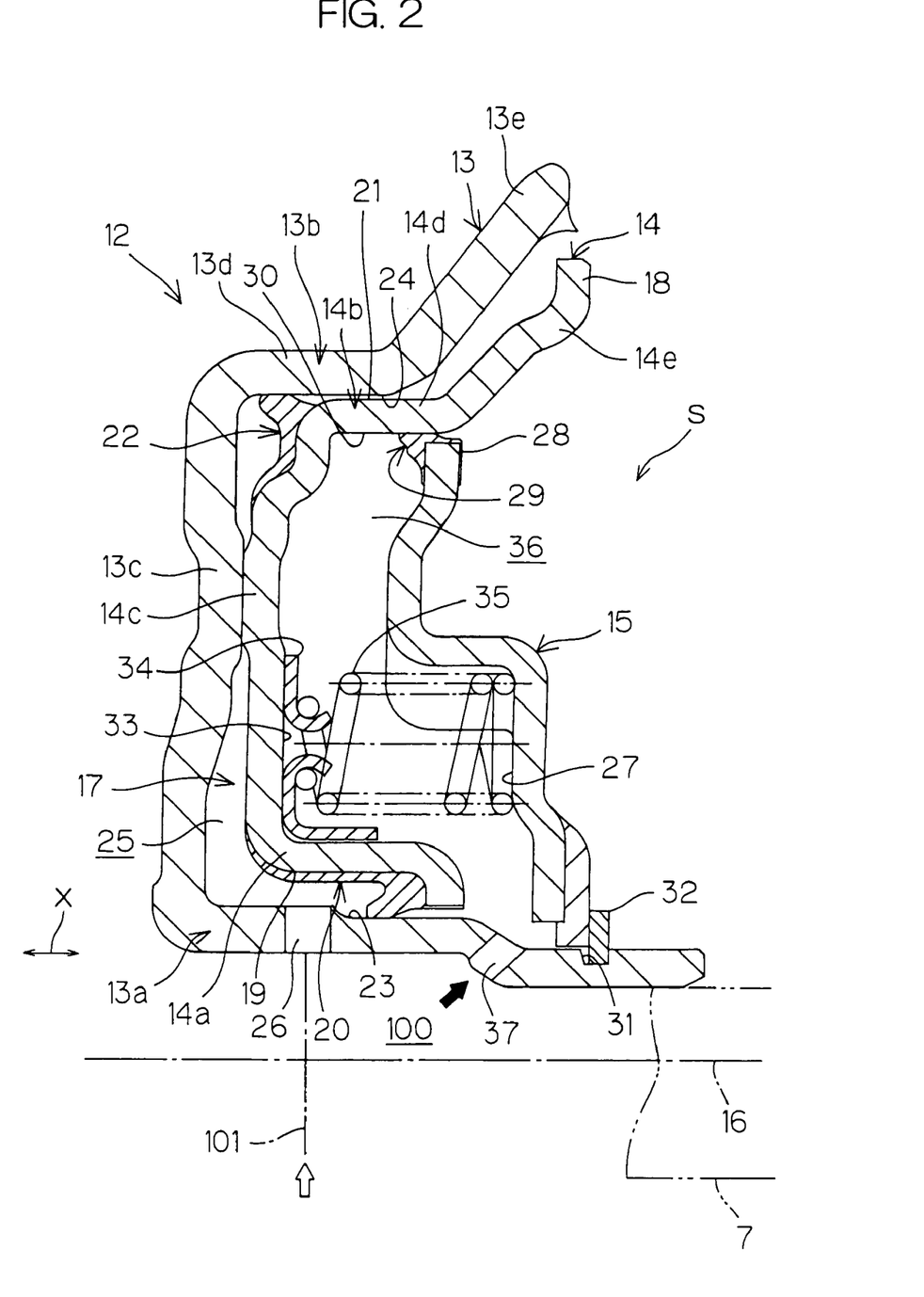
FIG. 2 is a schematic sectional view showing a principal part of a clutch in an automatic transmission in enlarged fashion.

Referring to FIG. 2, the clutch 12 comprises a piston member 14 and a partition plate 15 in its housing 13. The housing 13, the piston member 14, and the partition plate 15 respectively have an annular shape, and are arranged centered around a central axis 16 of the input shaft 7.

The housing 13 comprises an inner cylinder 13a formed in an annular shape around the central axis 16, an outer cylinder 13b formed in an annular shape radially outward from the inner cylinder 13a around the central axis 16, and an annular end wall 13c for connecting the inner cylinder 13a and an end of the outer cylinder 13b (an end on the left side in FIG. 2). The housing 13 has a groove shape in cross section, and a cylinder 17 serving as an accommodation chamber is formed in an annular shape. Further, the outer cylinder 13b in the housing 13 comprises a cylindrical portion 13d concentric with the central axis 16 and a tapered portion 13e extending radially outward as it axially moves farther apart from the cylindrical portion 13d.

The piston member 14 comprises an inner cylinder 14a formed in an annular shape around the central axis 16, an outer cylinder 14b formed in an annular shape radially outward from the inner cylinder 14a around the central axis 16, and an annular end wall 14c for connecting the inner cylinder 14a and one end of the outer cylinder 14b (an end on the left side in FIG. 2). The piston member 14 slides back and forth to and from the housing 13 along a sliding direction X parallel to the central axis 16.

The outer cylinder 14b in the piston member 14 comprises a cylindrical portion 14d concentric with the central axis 16, a tapered portion 14e extending radially outward as it axially moves farther apart from the cylindrical portion 14d, and a pressing portion 18 extending radially outward from the tapered portion 14e. The inner cylinder 14a in the piston member 14 has an annular sealing member 20 made of rubber provided on its inner peripheral surface. Further, the outer cylinder 14b in the piston member 14 has an annular sealing member 22 provided on the side of the end wall 14c of its outer peripheral surface 21. The central axis of each of the sealing members 20 and 22 is on the central axis 16.

The piston member 14 is inserted into the cylinder chamber 17 so as to be axially slidable. The sealing member 20 is brought into contact with an outer peripheral surface 23 of the inner cylinder 13a in the housing 13. The sealing member 22 is brought into contact with an inner peripheral surface 24 of the outer cylinder 13b in the housing 13. A first oil chamber 25 serving as a fluid chamber is defined in the cylinder chamber 17 by the housing 13, the piston member 14, and the sealing members 20 and 22.

A communicating hole 26 for communicating the first oil chamber 25 and a path 101 provided radially inward from the inner cylinder 13a in the housing 13 is pierced through the inner cylinder 13a in the housing 13. A hydraulic fluid pressurized by a pressure device (not shown) can flow into the first oil chamber 25 (indicated by a hollow arrow in FIG. 2) through the communicating hole 26.

The partition plate 15 is a member made of a sheet metal, for example, formed in an annular shape around the central axis 16. A flat portion 27 parallel to the end wall 14c in the piston member 14 is provided on a side surface, on the side of the first oil chamber 25, of the partition plate 15. Further, an annular sealing member 29 is provided on the outer periphery 28 of the partition plate 15. The sealing member 29 is arranged so as to be brought into contact with an inner peripheral surface 30 of the outer cylinder 14b in the piston member 14. Further, a groove 31 is formed in the inner cylinder 13a in the housing 13, and a snap ring 32 is fitted in the groove 31. The partition plate 15 abuts against the snap ring 32 so that the movement in one axial direction (rightward in FIG. 2) of the partition plate 15 is restricted.

The end wall 14c in the piston member 14 has a flat portion 33 provided on its side surface opposite to the partition plate 15, and a holding member 34 is attached to the flat portion 33. An elastic member 35 such as a coiled spring, for example, is attached, parallel to the central axis 16, to the holding member 34. The elastic member 35 always axially presses the piston member 14 and the partition plate 15.

Furthermore, a second oil chamber 36 serving as a back pressure chamber is defined in the cylinder chamber 17 by the partition plate 15, the sealing member 29, the piston member 14, the sealing member 20, and the inner cylinder 13a in the housing 13. The first oil chamber 25 serving as a fluid chamber and the second oil chamber 36 serving as a back pressure chamber are arranged side by side along the axis of the cylinder chamber 17. A communicating hole 37 for communicating the second oil chamber 36 and a region 100 provided radially inward from the inner cylinder 13a in the housing 13 is pierced through the inner cylinder 13a in the housing 13. A hydraulic fluid stored in the region 100 can flow into the second oil chamber 36 (a solid arrow in FIG. 2) through the communicating hole 37.

The piston member 14 with the sealing members 20 and 22 is accommodated in the cylinder chamber 17, and the partition plate 15 with the sealing member 29 is accommodated therein, thereby constituting a sealing device S according to the present embodiment. The sealing members 20, 22, and 29 mainly function as a seal for linear reciprocating motion of the piston member 14. However, the piston member 14 is rotated relative to the housing 13 and the partition plate 15 and therefore, also functions as a seal for rotation.

Figure 3:
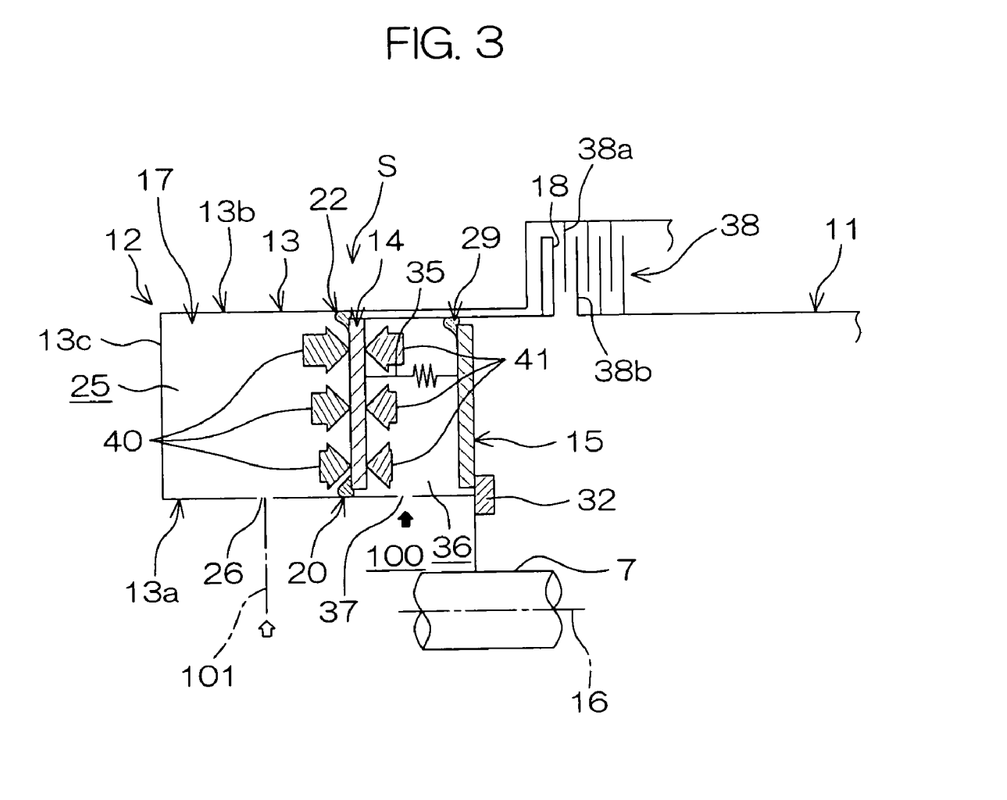
FIG. 3 is a schematic view showing a cylinder and a piston for explaining centrifugal oil pressure.

In the present embodiment, the pressurized hydraulic fluid flows into the first oil chamber 25 through the communicating hole 26, to slide the piston member 14 toward the second oil chamber 36 against an urging force of the elastic member 35. Consequently, the pressing portion 18 in the piston member 14 presses each of a plurality of first and second clutch plates 38a and 38b (generically merely referred to as a clutch plate 38) arranged parallel to the pressing portion 18, as shown in FIG. 3. Consequently, the clutch plates 38a and 38b are pressed against each other, thereby making it possible to transmit the power from the input shaft 7 shown in FIG. 1 to the transmission mechanism 11 through the clutch 12.

The clutch 12 is a so-called actuating cylinder in one direction only, so that the pressurized hydraulic fluid is supplied to only the first oil chamber 25. When the piston member 14 slides toward the second oil chamber 36 by the oil pressure of the supplied hydraulic fluid, the elastic member 35 is compressed in the axial direction.

When the oil pressure of the hydraulic fluid in the first oil chamber 25 is reduced, a force for pressing the piston member 14 toward the second oil chamber 36 is reduced, so that the piston member 14 is pushed back toward the first oil chamber 25 by the urging force of the elastic member 35. As a result, the pressing portion 18 in the piston member 14 releases the pressing of the clutch plate 38 shown in FIG. 3, so that the transmission of the power through the clutch 12 is interrupted.

Referring to FIG. 3, the housing 13 is attached to the input shaft 7 so as to be integrally rotatable. When the housing 13 is rotated together with the rotation of the input shaft 7, the hydraulic fluid in the cylinder chamber 17 receives a centrifugal force proportional to the square of the number of revolutions of the input shaft 7, thereby developing so-called centrifugal oil pressure. Specifically, centrifugal oil pressure 40 for urging the piston member 14 toward the second oil chamber 36 is developed in the first oil chamber 25, while centrifugal oil pressure (back pressure) 41 for urging the piston member 14 toward the first oil chamber 25 is developed in the second oil chamber 36. The centrifugal oil pressure 40 and the centrifugal oil pressure (back pressure) 41 are canceled out each other. Consequently, it is possible to minimize the effect of the centrifugal oil pressure developed in the clutch 12 by the rotation of the housing 13 to minimize the effect of the centrifugal oil pressure on the operation of the piston member 14.

Each of the sealing members 20, 22, and 29 will be then described in detail. First referring to FIG. 4, the sealing member 20 on the side of the inner cylinder 14a in the piston member 14 comprises an inner peripheral portion 43 forming a seal lip 42, directed radially inward, serving as a sliding contact portion brought into sliding contact with the outer peripheral surface 23 of the inner cylinder 13a in the housing 13 and an outer peripheral portion 44 attached to an inner peripheral surface 19 of the inner cylinder 14a in the piston member 14.

Figure 4:
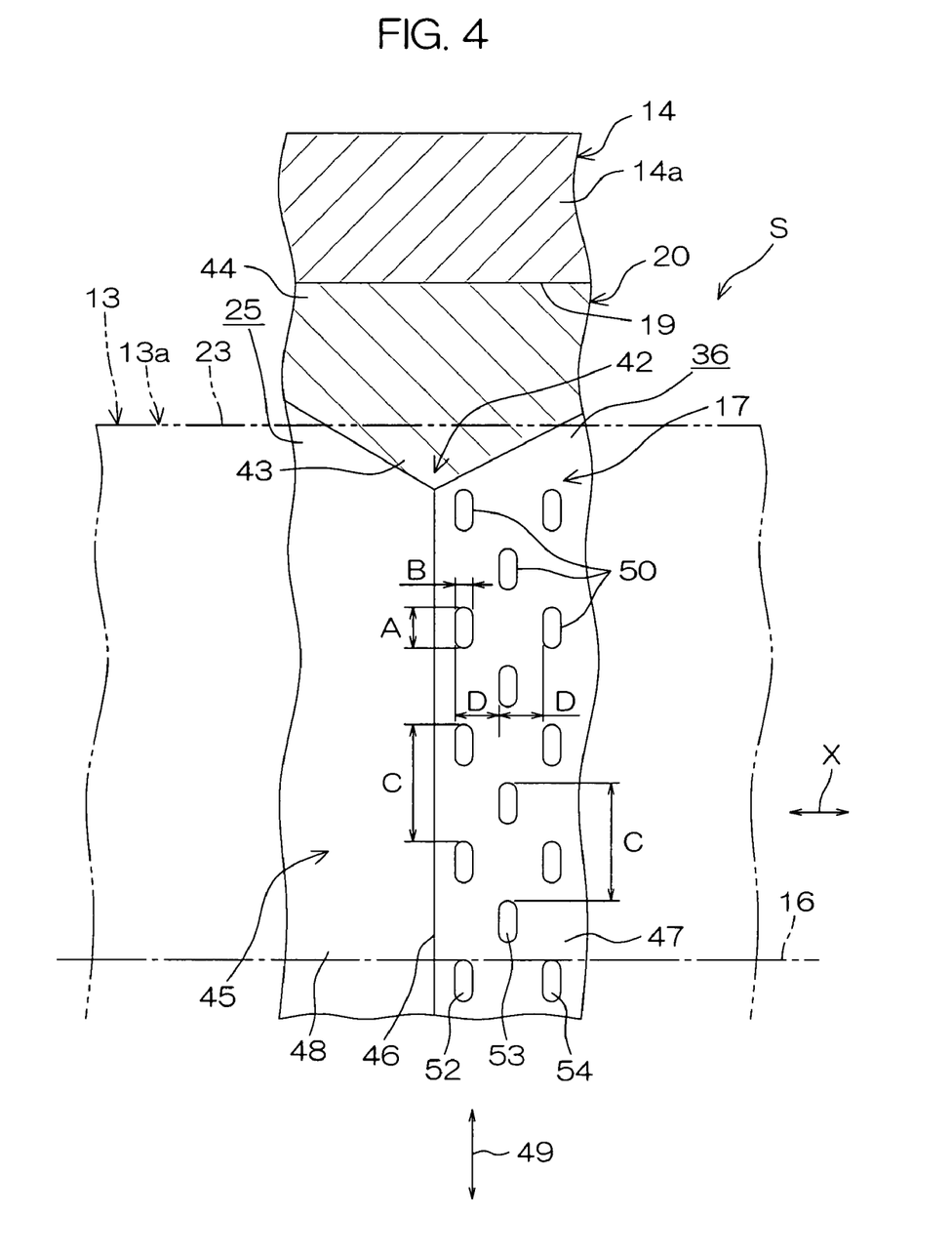
FIG. 4 is an enlarged sectional view showing a principal part of a sealing member provided in an inner cylinder of a piston shown in FIG. 2.

A surface 45 of the inner peripheral portion 43 in the sealing member 20 has a second oil chamber-side inclined surface 47 and a first oil chamber-side inclined surface 48 on both sides of a front edge 46 of the seal lip 42. A lot of recessed streaks 50, which are independent of one another, extending along the circumference 49 of the seal lip 42 are formed on the second oil-chamber side inclined surface 47 so as to constitute each of a plurality of columns 52, 53, and 54. The recessed streaks 50 constituting the adjacent columns 52, 53, and 54 are alternately arranged.

Figure 5:
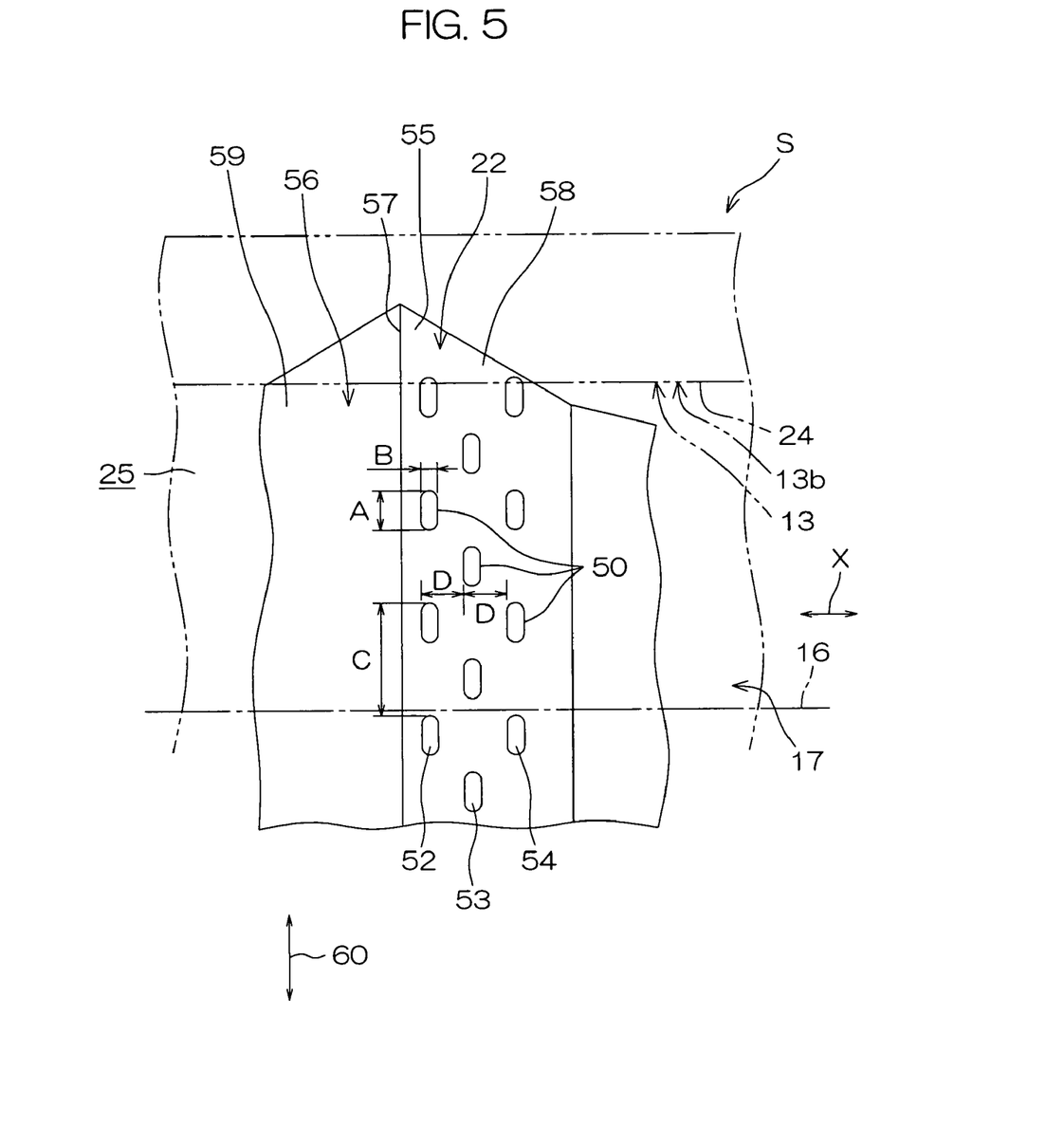
FIG. 5 is an enlarged sectional view showing a principal part of a sealing member provided in an inner cylinder of a piston shown in FIG. 2.

Referring to FIG. 5, the sealing member 22 on the side of the outer cylinder 14b in the piston member 14 comprises a seal lip 55, directed radially outward, serving as a sliding contact portion brought into sliding contact with the inner peripheral surface 24 of the outer cylinder 13b in the housing 13.

A surface 56 of the seal lip 55 has a second oil chamber-side inclined surface 58 and a first oil chamber-side inclined surface 59 on both sides of a front edge 57 of the seal lip 55. Recessed streaks 50 are formed on the second oil chamber-side inclined surface 58 in the same manner as those in the sealing member 20. That is, a lot of recessed streaks 50, which are independent of one another, extending along the circumference 60 of the seal lip 55 are formed so as to constitute each of a plurality of columns 52, 53, and 54. The recessed streaks 50 in the adjacent columns 52, 53, and 54 are alternately arranged.

Figure 6:
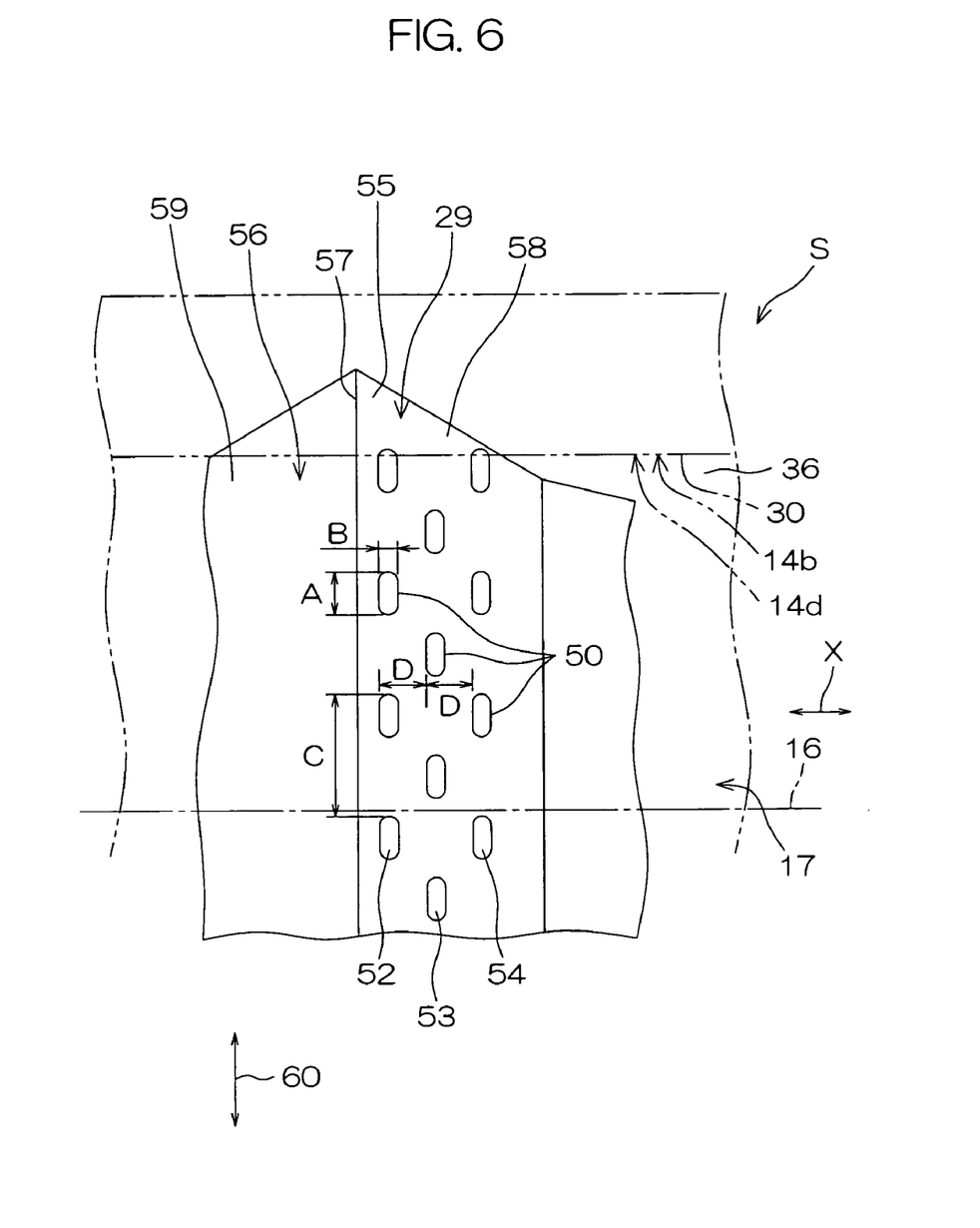
FIG. 6 is an enlarged sectional view showing a principal part of a sealing member provided on the outer periphery of a partition plate shown in FIG. 2.

As shown in FIG. 6, the sealing member 29 provided on the outer periphery 28 of the partition plate 15 is constructed similarly to the sealing member 22. That is, the sealing member 29 comprises a seal lip 55, directed radially outward, serving as a sliding contact portion brought into sliding contact with the inner periphery surface 30 of the outer cylinder 14b in the piston member 14, and recessed streaks 50 of the same construction as those in the sealing member 22 are formed in the seal lip 55 so as to constitute each of columns 52, 53, and 54.

According to the present embodiment, a lot of recessed streaks 50 are formed so as to constitute each of a plurality of columns 52, 53, and 54 on each of the second oil chamber-side inclined surfaces 47 and 58 of the seal lips 42 and 55, serving as a sliding contact portion, of the sealing members 20 and 22 inside and outside the annular piston member 14 accommodated in the annular cylinder chamber 17. Therefore, the sliding area of each of the seal lips 42 and 55 is reduced, thereby making it possible to significantly reduce the sliding resistance thereof.

Furthermore, a sufficient amount of hydraulic fluid can be held in each of the second oil chamber-side inclined surfaces 47 and 58 by a lot of recessed streaks 50, thereby making it possible to more reliably reduce the sliding resistance of each of the seal lips 42 and 55. Consequently, it is possible to further improve the response characteristics of the operation of the piston member 14.

Moreover, the same recessed streaks 50 are also provided in the sealing member 29 brought into sliding contact with the inner peripheral surface 30 of the outer cylinder 14b in the piston member 14, and sliding resistance between the sealing member 29 and the piston member 14 is also reduced, thereby making it possible to further improve the response characteristics of the operation of the piston member 14.

It is preferable that the depth of the recessed streaks 50 is in a range of 20 to 100 μm. If the depth of the recessed streaks 50 is less than 20 μm, the lubricating effect cannot be sufficiently obtained. If the depth of the recessed streaks 50 exceed 100 μm, problems may arise in the workability of the recessed streaks 50 and the strength of the seal lip 42. Therefore, the depth of the recessed streaks 50 is set in the above-mentioned range. The depth of the recessed streaks 50 is more preferably in a range of 40 to 80 μm.

It is preferable that the length A in the longitudinal direction of the recessed streaks 50 is in a range of 100 to 500 μm or in a range of 2 to 2.5 times of the width B. If the length A in the longitudinal direction of the recessed streaks 50 is less than 100 μm, the lubricating effect cannot be sufficiently obtained. If the length of the recessed streaks 50 exceed 500 μm, problems may arise in the reduction in sealing performance and the production of abnormal noises. Therefore, the length A in the longitudinal direction of the recessed streaks 50 is set in the above-mentioned range. The length A in the longitudinal direction of the recessed streaks 50 is more preferably in a range of 200 to 400 μm.

It is preferable that the width B in the transverse direction of the recessed streaks 50 is in a range of 50 to 200 μm. If the width B in the transverse direction of the recessed streaks 50 is less than 50 μm, the lubricating effect cannot be sufficiently obtained. If the width B of the recessed streaks 50 exceed 200 μm, the number of recessed streaks 50 provided on the second oil chamber-side inclined surface 47 in the seal lip 42 is reduced, so that the sealing performance may be degraded. Therefore, the width B in the transverse direction of the recessed streaks 50 is set in the above-mentioned range. The width B in the transverse direction of the recessed streaks 50 is more preferably in a range of 80 to 150 μm.

It is preferable that the adjacent recessed streaks 50 in the same column are arranged such that the pitch C along the circumference 49 is in a range of 1.3 to 3 times the length A of the recessed streaks 50. In a case where the pitch C along the circumference 49 is less than 1.3 times the length A of the recessed streaks 50 (C<1.3 A), the sealing performance may be degraded. If the pitch C exceeds three times the length A of the recessed streaks 50 (C>3A), the lubricating effect cannot be sufficiently obtained. Accordingly, the pitch C is set in the above-mentioned range. The pitch C along the circumference 49 is more preferably in a range of 1.3 to 2 times the length A of the recessed streaks 50.

It is preferable that the adjacent recessed streaks 50 in the same column are arranged such that the pitch D in the axial direction among the columns 52, 53, and 54 is in a range of 1.3 to 3 times the width B of the recessed streaks 50. In a case where the pitch D in the axial direction is less than 1.3 times the width B of the recessed streaks 50 (D<1.3 B), the sealing performance may be degraded. If the pitch D exceeds three times the width B of the recessed streaks 50 (D>3 B), the lubricating effect cannot be sufficiently obtained. Accordingly, the pitch D is set in the above-mentioned range. The pitch D in the axial direction is more preferably in a range of 1.3 to 2 times the width B of the recessed streaks 50.

Although in the above-mentioned embodiment, the recessed streaks 50 which are characteristic portions are applied to the sealing members 20 and 22 for the piston member 14, the recessed streaks 50 may be applied to either one of the sealing members 20 and 22, in which case the effect of reducing the sliding resistance thereof is obtained. Although in the above-mentioned embodiment, the recessed streaks 50 are applied to the sealing member 29 for the partition plate 15, a case where the recessed streaks 50 are not applied to the sealing member 29 is also considered.

Figure 7:
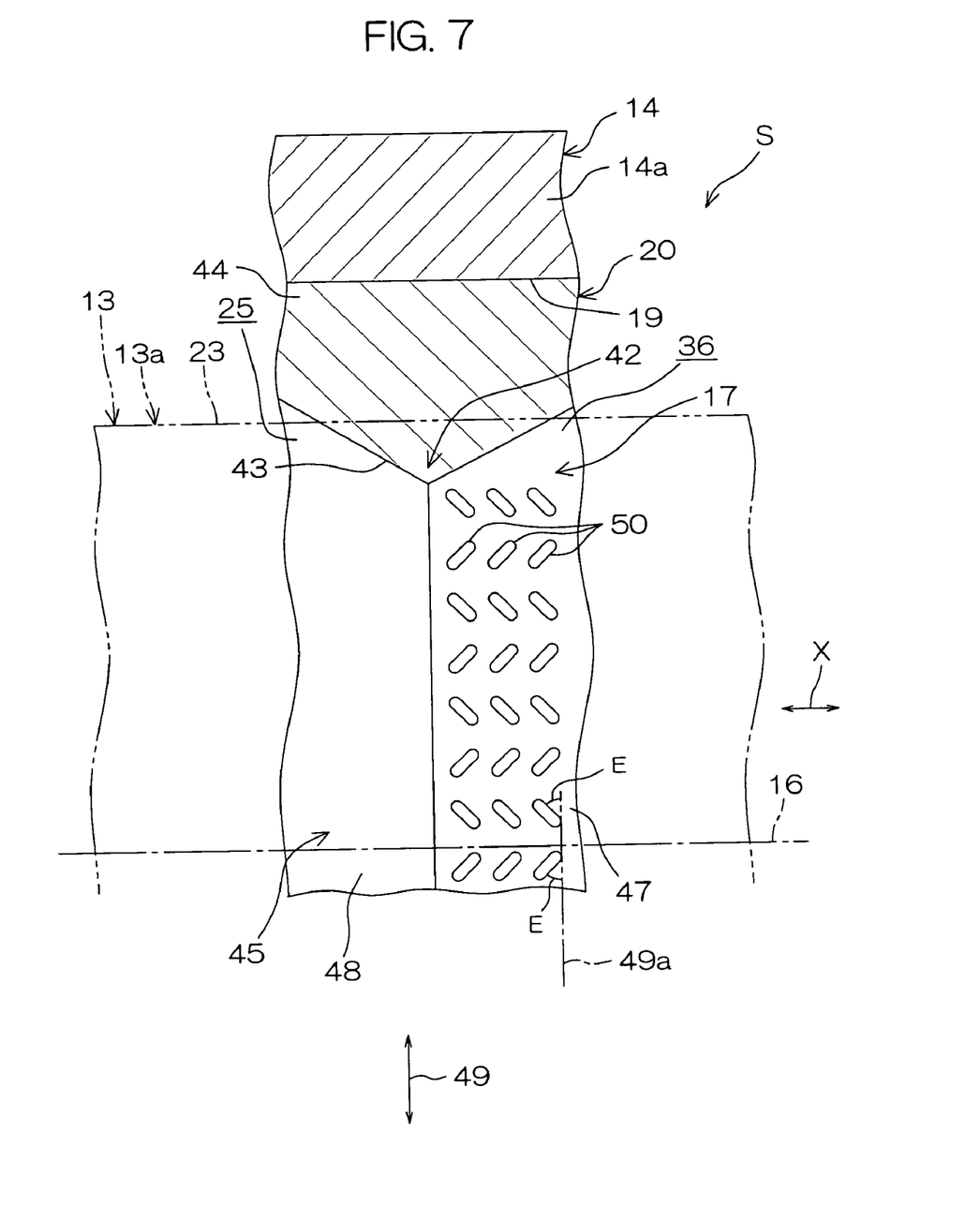
FIG. 7 is an enlarged sectional view showing a principal part of a sealing member according to another embodiment of the present invention.

The recessed streaks 50 are not limited to ones along the circumference 49 of the sealing member 20. For example, the recessed streaks 50 may have a predetermined tilt angle E to the circumference 49 of the sealing member 20 (an axis 49a along the circumference 49), as shown in FIG. 7. In this case, it is preferable that the adjacent recessed streaks 50 in the same column are inclined in opposite directions (that is, so as to form a V-shaped pattern). The recessed streaks 50 in each of the sealing members 22 and 29 may also have a predetermined tilt angle E along the circumference 60 (an axis along the circumference 60), which is not illustrated. The tilt angle E is preferably in a range of 25 to 65 degrees, and more preferably in a range of 40 to 50 degrees.

Uneven streaks are not limited to the recessed streaks 50. They may be protruding streaks. In this case, in terms of attaining high sealing performance and low sliding properties, the height of the protruding streaks is preferably in a range of 20 to 100 μm, and more preferably in a range of 40 to 80 μm. Even when the uneven streaks are protruding streaks, the same function and effect as those in the case of the recessed streaks 50 can be produced. That is, the sliding area of each of the seal lips 42 and 55 is reduced. Further, the hydraulic fluid is very easy to store around the protruding streaks. Accordingly, the sliding resistance of each of the seal lips 42 and 55 can be significantly reduced.

Although in the above-mentioned embodiment, description was made of a case where the recessed or protruding streaks are formed on the second oil chamber-side inclined surface, the present invention is not limited to the same. For example, the recessed or protruding streaks may be formed on the first oil chamber-side inclined surface. Alternatively, the recessed or protruding streaks may be formed on both the first oil chamber-side inclined surface and the second oil chamber-side inclined surface.

Furthermore, the shape of the recessed or protruding streaks may be a square, an ellipse, or a rhombus.

Although in the above-mentioned embodiment, description was made in conformity with an example in which the sealing device according to the present invention is applied to the sealing device for the piston member 14, the present invention is not limited to the same.

Figure 8:
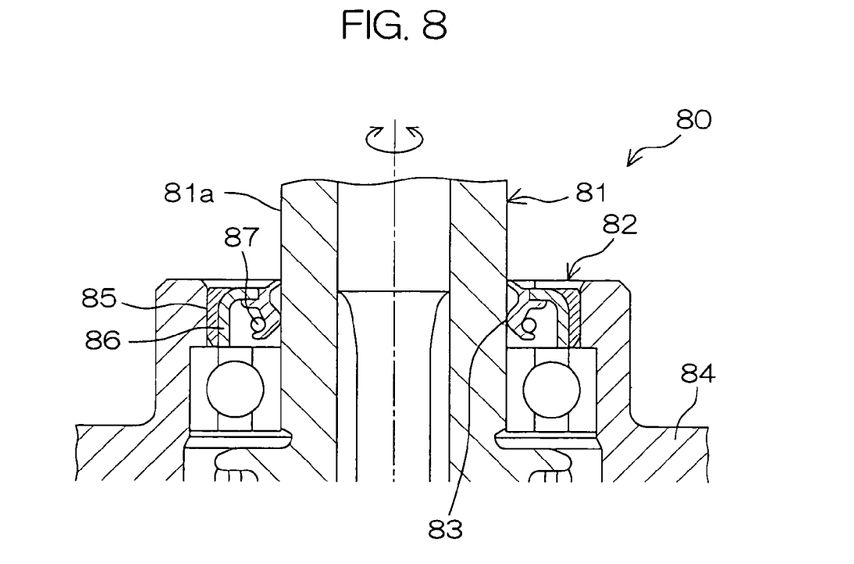
FIG. 8 is a partial sectional schematic view showing an electric power steering device to which a sealing device according to still another embodiment of the present invention is applied.

The present invention may be applied to a sealing device 82 for an input shaft 81 serving as a rotating member of an electric power steering device 80, as shown in FIG. 8. In FIG. 8, the sealing device 82 seals an area between a housing 84 in the electric power steering device 80 and the input shaft 81, and comprises a sealing member 85 composed of an elastic member such as rubber and having a seal lip 83 serving as a sliding contact, a reinforcing core metal 86 embedded in the sealing member 85, and a backup ring 87.

It is possible to provide the seal lip 83 with the above-mentioned recessed or protruding streaks 50 (see FIG. 7) alternatively forming inclined patterns in opposite directions, to reduce sliding resistance in rotation.

Figure 9:
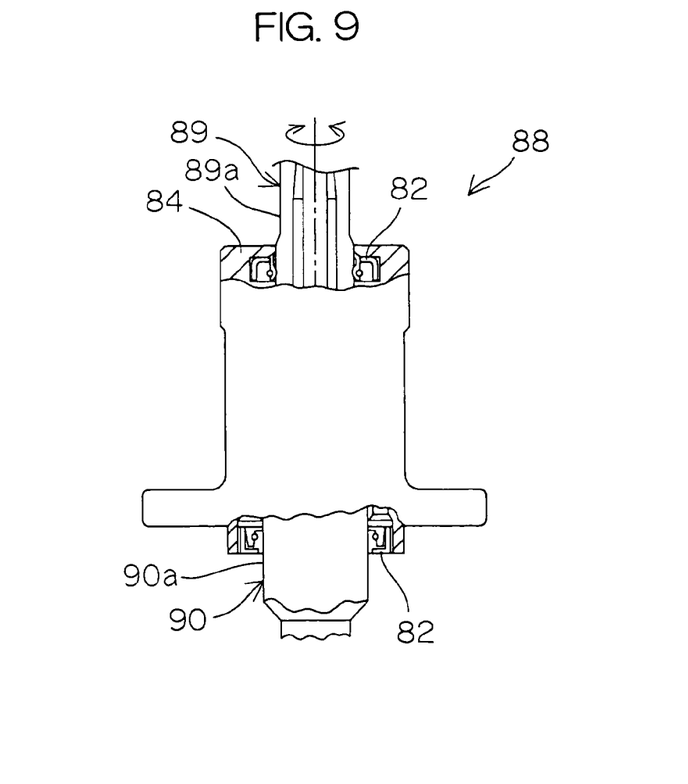
FIG. 9 is a partial sectional schematic view showing a hydraulic power steering device to which a sealing device according to still another embodiment of the present invention is applied.

Furthermore, a sealing device 82 of the same construction is applicable as an oil seal for an input shaft 89 and an output shaft 90 serving as a rotating member of a hydraulic power steering device 88, as shown in FIG. 9.

Furthermore, in a bearing seal having a sliding contact portion such as a seal lip which is fixed to either one of an inner ring and an outer ring of a bearing and brought into sliding contact with the other ring, the sliding resistance of the bearing can be reduced by providing the sliding contact portion with the above-mentioned recessed or protruding streaks forming inclined patterns in opposite directions. The same is true for a bearing seal for packing.

Furthermore, sliding resistance in rotation reciprocating motion can be reduced by providing a sliding contact portion such as a seal lip of an oil seal for a crank shaft of an engine with the above-mentioned recessed or protruding streaks forming inclined patterns in opposite directions.

Furthermore, the sealing device 82 of the same construction is applicable to a reciprocating rod serving as a linear reciprocating member.

Figure 10:
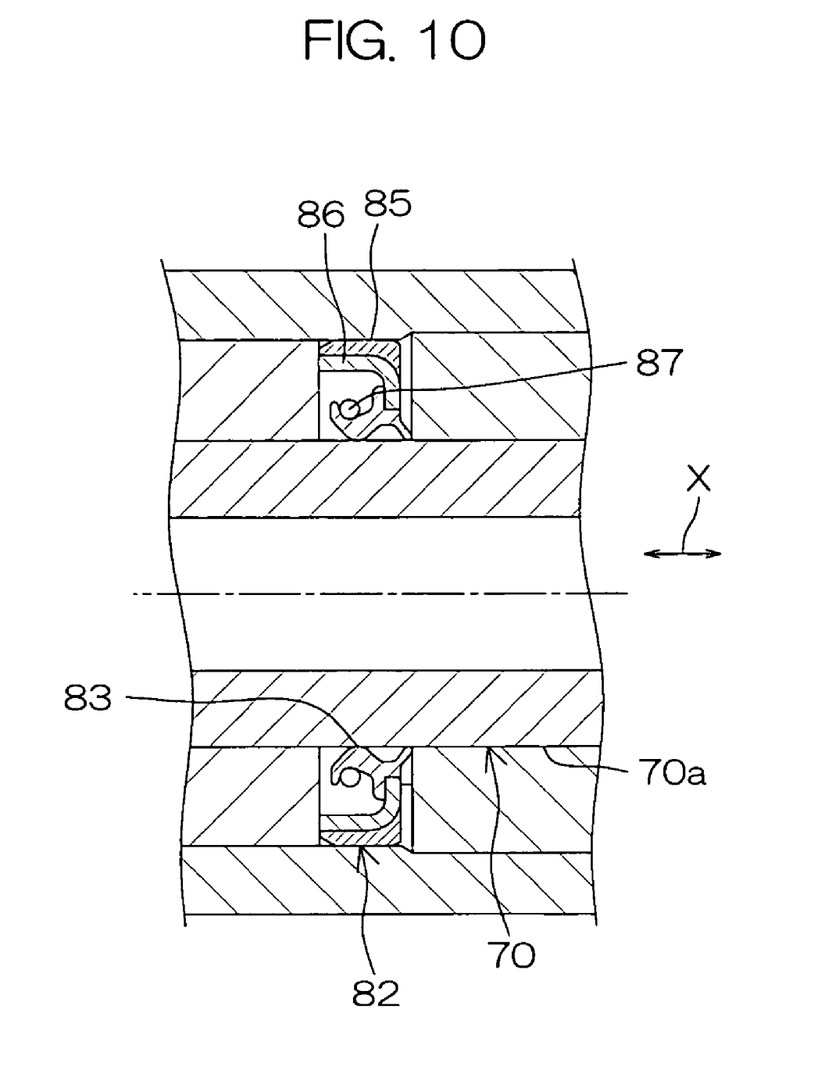
FIG. 10 is a partial sectional schematic view showing a principal part of a steering device to which a sealing device according to still another embodiment of the present invention is applied.

In a steering device, for example, the above-mentioned sealing device 82 is used as a rod seal for a rack bar 70 serving as a linear reciprocating member extending toward the right and the left of a vehicle, and a sliding contact portion such as a seal lip brought into sliding contact with an outer peripheral surface 70a of the rack bar 70 is provided with the above-mentioned recessed or protruding streaks forming inclined patterns in opposite directions, thereby making it possible to reduce sliding resistance in linear reciprocating motion of the rack bar 70, as shown in FIG. 10.

Furthermore, the above-mentioned sealing device 82 is used as a rod seal for a reciprocating rod of a shock absorber used for a suspension, and a sliding contact portion such as a seal lip is provided with the above-mentioned recessed or protruding streaks forming inclined patterns in opposite directions, thereby making it possible to reduce sliding resistance in linear reciprocating motion of the reciprocating rod.

The above-mentioned sealing device 82 is used as a rod seal for a valve stem serving as a linear reciprocating member of an engine, and a sliding contact portion such as a seal lip is provided with the above-mentioned recessed or protruding streaks forming inclined patterns in opposite directions, thereby making it possible to reduce the sliding resistance in linear reciprocating motion of the valve stem.

Figure 11:
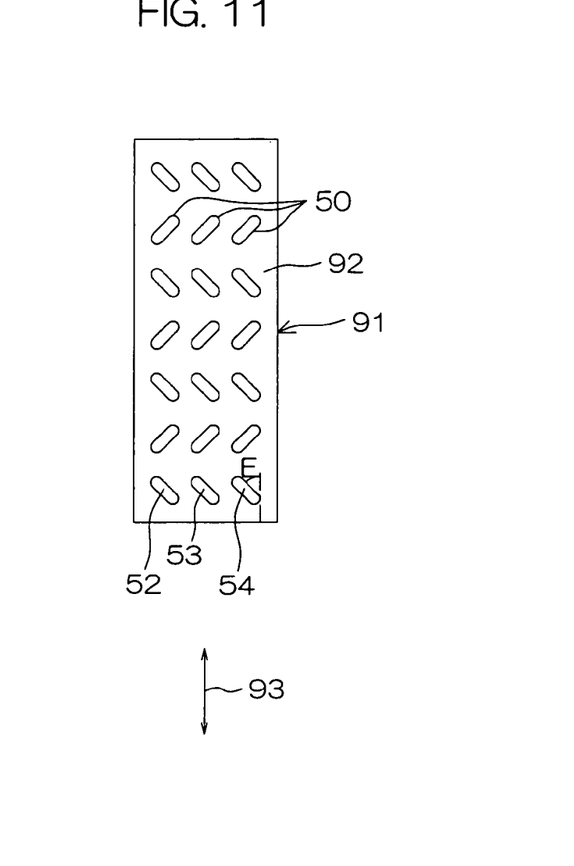
FIG. 11 is a schematic view showing a sliding member serving as still another embodiment of the present invention.

Furthermore, the present invention is not limited to applications to a sealing device such as an oil seal. For example, the present invention is applicable to a sliding member 91 composed of a high polymer material such as synthetic resin, for example, synthetic rubber or nylon 66, as shown in FIG. 11. That is, a sliding contact portion 92 in the sliding member 91 is provided with the above-mentioned recessed or protruding streaks 50 forming patterns in opposite directions inclined at an angle E in opposite directions to a sliding direction X, to reduce sliding resistance.

EXAMPLES 1 AND 2 AND COMPARATIVE EXAMPLE 1

Figure 12:
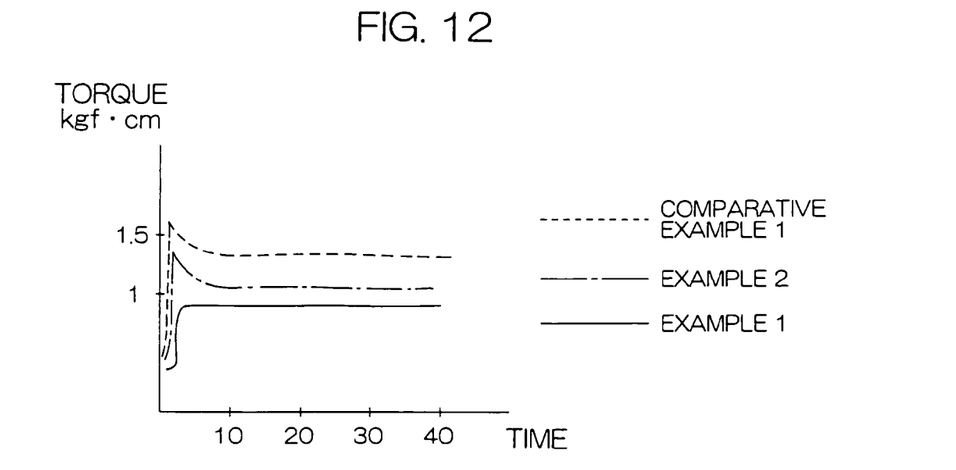
FIG. 12 is a graph showing the change with time of a rolling friction torque.

An example 1 in which recessed streaks forming the same ハ-shaped pattern as that shown in FIG. 7 are formed on an oil-side inclined surface of an inward lip of an oil seal for a rotating axis, an example 2 in which recessed streaks extending along the same circumference as that shown in FIG. 4 are formed on the oil-side inclined surface, and a comparative example 1 in which no recessed or protruding streaks are formed were produced, and rolling friction torques were respectively measured, thereby obtaining results shown in FIG. 12.

Referring to FIG. 12, the start rolling friction torque and the stable rolling friction torque (after 10 hours) are as follows:

| Start rolling friction torque | |
| --- | --- |
| Comparative Example 1 | 1.6 Kgf · cm (15.7 N · cm) |
| Example 1 | 0.9 Kgf · cm (8.8 N · cm) |
| Example 2 | 1.3 Kgf · cm (12.7 N · cm) |

| Stable rolling friction torque | |
| --- | --- |
| Comparative Example 1 | 1.4 Kgf · cm (13.7 N · cm) |
| Example 1 | 0.9 Kgf · cm (8.8 N · cm) |
| Example 2 | 1.1 Kgf · cm (10.8 N · cm) |

Consequently, the following became clear. That is, in the example 1, the start rolling friction torque can be reduced by 43%, and the stable rolling friction torque can be reduced by 35%, as compared with those in the comparative example 1 (a conventional product). In the example 2, the start rolling friction torque can be reduced by 20%, and the stable rolling friction torque can be reduced by 20%, as compared with those in the comparative example 1 (a conventional product). That is, it became clear that the significant effect of reducing both the start rolling friction torque and the stable rolling friction torque was obtained. Particularly in the example 1, the start rolling friction torque has a value equal to the stable rolling friction torque, so that ideal friction properties are obtained.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

This application corresponds to Japan Patent Application No. 2002-193507 filed with the Japan Patent Office on Jul. 2, 2002 and No. 2002-241599 filed with the Japanese Patent Office on Aug. 22, 2002, the disclosures of which are incorporated hereinto by reference.

What is claimed is:

1. A sealing device, comprising:
    a sealing member brought into contact with a contact surface so as to be slidable in a predetermined sliding direction,
    the sealing member comprising
        a sliding contact portion to be brought into sliding contact with the contact surface, and
        a plurality of recessed or protruding streaks, which are independent of one another, provided side by side in an array so as to constitute a plurality of columns, and a plurality of rows on a surface of the sliding contact portion, wherein each streak is bordered along its entire circumference by the surface of the sliding contact portion, so as to separate each streak from an adjacent streak by a space,
    the plurality of streaks including a plurality of recessed streaks in which a hydraulic fluid is stored or a plurality of protruding streaks around which the hydraulic fluid is stored,
    the recessed or protruding streaks of each of the columns being spaced side by side in the predetermined sliding direction,
    the columns being spaced side by side in a perpendicular direction relative to the predetermined sliding direction to form the plurality of rows,
    longitudinal directions of the recessed or protruding streaks of each of the rows being alternately inclined in opposite directions relative to the predetermined sliding direction, and
    the recessed or protruding streaks of each respective row being inclined in same directions relative to the predetermined sliding direction.

2. The sealing device according to claim 1, wherein the sliding contact portion includes an annular seal lip rotated relative to the contact surface.

3. The sealing device according to claim 2, wherein the sealing member is brought into sliding contact with an outer peripheral surface of a rotating member.

4. The sealing device according to claim 1, wherein the sliding contact portion includes an annular seal lip axially moved relative to the contact surface.

5. The sealing device according to claim 4, wherein the sealing member is brought into sliding contact with a peripheral surface of a linear reciprocating member.

6. The sealing device according to claim 1, further comprising
    an annular piston accommodated in an annular accommodation chamber for defining an annular fluid chamber in the annular accommodation chamber, there being provided a plurality of sealing members,
the plurality of sealing members including inner and outer sealing members provided in the annular piston.

7. The sealing device according to claim 6, wherein the annular accommodation chamber is formed between an inner cylinder and an outer cylinder in a housing, and
an outer peripheral surface of the inner cylinder and an inner peripheral surface of the outer cylinder are respectively provided with contact surfaces respectively corresponding to the inner and outer sealing members.

8. The sealing device according to claim 6, further comprising
an annular partition plate for defining an annular back pressure chamber for applying back pressure to the annular piston,
the plurality of sealing members including an annular sealing member provided on at least the outer periphery of the partition plate.

9. The sealing device according to claim 8, wherein the annular piston comprises an inner cylinder, an outer cylinder, and an annular end wall for connecting respective one ends of the inner cylinder and the outer cylinder,
an inner peripheral surface of the outer cylinder being provided with a contact surface corresponding to the annular sealing member provided on the outer periphery of the partition plate.

10. The sealing device according to claim 6, wherein the annular piston includes a piston for operating a clutch in an automatic transmission of an automobile.

11. The sealing device according to claim 1, wherein the recessed or protruding streaks constituting the adjacent columns are alternately arranged.

12. The sealing device according to claim 2, wherein the recessed or protruding streaks constituting the column are inclined along the circumference of the annular seal lip.

13. The sealing device according to claim 12, wherein the recessed or protruding streaks constituting the column are alternately inclined in opposite directions.

14. The sealing device according to claim 1, wherein the sliding contact portion is comprised of a high polymer material including rubber or synthetic resin.

15. A sliding member brought into contact with a contact surface so as to be slidable in a predetermined sliding direction, comprising:
a sliding contact portion containing a high polymer material to be brought into sliding contact with the contact surface; and
a plurality of recessed or protruding streaks, which are independent of one another, provided side by side in an array so as to constitute a plurality of columns, and a plurality of rows on a surface of the sliding contact portion, wherein each streak is bordered along its entire circumference by the surface of the sliding contact portion, so as to separate each streak from an adjacent streak by a space,
the plurality of streaks including a plurality of recessed streaks in which a hydraulic fluid is stored or a plurality of protruding streaks around which the hydraulic fluid is stored,
the recessed or protruding streaks of each of the columns being spaced side by side in the predetermined sliding direction.
the columns being spaced side by side in a perpendicular direction relative to the predetermined sliding direction to form the plurality of rows.
longitudinal directions of the recessed or protruding streaks of each of the rows being alternately inclined in opposite directions relative to the predetermined sliding direction, and
the recessed or protruding streaks of each respective row being inclined in same directions relative to the predetermined sliding direction.

16. The sliding member according to claim 15, wherein the high polymer material includes rubber or synthetic resin.

17. The sealing device according to claim 1, wherein each streak is elongated and has a length and a width, with the length being greater than the width.

18. The sliding member according to claim 15, wherein each streak is elongated and has a length and a width, with the length being greater than the width.

19. A sealing device comprising:
a sealing member brought into contact with a contact surface so as to be slidable in a predetermined sliding direction,
the sealing member comprising
a sliding contact portion to be brought into sliding contact with the contact surface, and
a plurality of recessed or protruding streaks, which are independent of one another, provided side by side so as to constitute a plurality of columns on a surface of the sliding contact portion, wherein each streak is bordered along its entire circumference by the surface of the sliding contact portion, so as to separate each streak from adjacent streak by a space,
the plurality of streaks including a plurality of recessed streaks in which a hydraulic fluid is stored or a plurality of protruding streaks around which the hydraulic fluid is stored,
the recessed or protruding streaks of each of the columns being spaced side by side in the predetermined sliding direction,
the columns being spaced side by side in a perpendicular direction relative to the predetermined sliding direction, and
a line extended in a longitudinal direction of each of the recessed or protruding streaks of each of the columns traversing a corresponding recessed or protruding streak of the adjacent columns so as to intersect a line in a longitudinal direction of the corresponding recessed or protruding streak.

20. A sliding member brought into contact with a contact surface so as to be slidable in a predetermined sliding direction, comprising:
a sliding contact portion containing a high polymer material to be brought into sliding contact with the contact surface; and
a plurality of recessed or protruding streaks, which are independent of one another, provided side by side so as to constitute a plurality of columns on a surface of the sliding contact portion, wherein each streak is bordered along its entire circumference by the surface of the sliding contact portion, so as to separate each streak from adjacent streak by a space,
the plurality of streaks including a plurality of recessed streaks in which a hydraulic fluid is stored or a plurality of protruding streaks around which the hydraulic fluid is stored,
the recessed or protruding streaks of each of the columns being spaced side by side in the predetermined sliding direction, the columns being spaced side by side in a perpendicular direction relative to the predetermined sliding direction, and a line extended in a longitudinal direction of each of the recessed or protruding streaks of each of the columns traversing a corresponding recessed or protruding streak of the adjacent columns so as to intersect a line in a longitudinal direction of the corresponding recessed or protruding streak.

21. The sealing device according to claim 1, wherein the sliding contact portion includes an annular sliding contact portion, the annular sliding contact portion is relatively rotatable with respect to the counter part member, and the predetermined sliding direction comprises a circumferential direction of the annular sliding contact portion.

22. The sealing device according to claim 1, wherein the sliding contact portion includes an annular sliding contact portion, the annular sliding contact portion is relatively movable with respect to the counter part member, and the predetermined sliding direction comprises an axial direction of the annular sliding contact portion.

23. The sealing device according to claim 19, wherein the sliding contact portion includes an annular sliding contact portion, the annular sliding contact portion is relatively rotatable with respect to the counter part member, and the predetermined sliding direction comprises a circumferential direction of the annular sliding contact portion.

24. The sealing device according to claim 19, wherein the sliding contact portion includes an annular sliding contact portion, the annular sliding contact portion is relatively movable with respect to the counter part member, and the predetermined sliding direction comprises an axial direction of the annular sliding contact portion.

25. The sealing device according to claim 24, wherein the sealing member is brought into sliding contact with a peripheral surface of a linear reciprocating member.

26. A sealing device comprising:

an annular piston accommodated in an annular accommodation chamber for defining an annular fluid chamber in the annular accommodation chamber; and a plurality of sealing members, the plurality of sealing members including inner and outer sealing members provided in the annular piston, each of the inner and outer sealing members including an annular sliding contact portion which forms an annular seal lip and is brought into sliding contact with a peripheral surfaces of the annular accommodation chamber, a plurality of streaks, which are independent of one another, being provided side by side so as to constitute a plurality of columns on a surface of the annular seal lip of at least one of the inner and outer sealing members, the plurality of streaks including a plurality of recessed streaks in which a hydraulic fluid is stored or a plurality of protruding streaks around which the hydraulic fluid is stored, the recessed or protruding streaks of each of the columns being spaced side by side in a circumferential direction of the annular seal lip, the columns being spaced side by side in an axial direction of the annular seal lip, the recessed or protruding streaks which are adjacent to each other in the circumferential direction of the annular seal lip being alternately inclined in opposite directions in the circumferential direction of the annular seal lip, and the recessed or protruding streaks which are adjacent to each other in the axial direction of the annular seal lip being inclined in same directions in the circumferential direction of the annular seal lip.

27. The sealing device of claim 26, further comprising an annular partition plate for defining an annular back pressure chamber for applying back pressure to the annular piston, the plurality of sealing members including an annular sealing member provided on at least the outer periphery of the partition plate, the annular sealing member provided on the at least the outer periphery of the partition plate including an annular sliding contact portion which form a second annular seal lip and is brought into sliding contact with a corresponding peripheral surface of the annular piston, a plurality of streaks, which are independent of one another, being provided side by side so as to constitute a plurality of columns on a surface of the second annular seal lip, the plurality of streaks including a plurality of recessed streaks in which a hydraulic fluid is stored or a plurality of protruding streaks around which the hydraulic fluid is stored, the recessed or protruding streaks of each of the columns being spaced side by side in a circumferential direction of the second annular seal lip, the columns being spaced side by side in an axial direction of the second annular seal lip, the recessed or protruding streaks which are adjacent to each other in the circumferential direction of the second annular seal lip being alternately inclined in opposite directions in the circumferential direction of the second annular seal lip, and the recessed or protruding streaks which are adjacent to each other in the axial direction of the second annular seal lip being inclined in same directions relative to the circumferential direction of the second annular seal lip.

28. A sealing device comprising:

an annular piston accommodated in an annular accommodation chamber for defining an annular fluid chamber in the annular accommodation chamber; and a sealing member being provided in the annular piston, the sealing member including an annular sliding contact portion which forms an annular seal lip and is brought into sliding contact with a predetermined peripheral surface of the annular accommodation chamber, and a plurality of streaks, which are independent of one another, provided side by side so as to constitute a plurality of columns on a surface of the annular seal lip, the plurality of streaks including a plurality of recessed streaks in which a hydraulic fluid is stored or a plurality of protruding streaks around which the hydraulic fluid is stored, the recessed or protruding streaks of each of the columns being spaced side by side in a circumferential direction of the annular seal lip, the columns being spaced side by side in an axial direction of the annular seal lip, a longitudinal direction of each of the recessed or protruding streaks being in the circumferential direction of the annular seal lip, a transverse direction of each of the recessed or protruding streaks being in the axial direction of the annular seal lip, a length in the longitudinal direction of each of the recessed or protruding streaks being in a range of 100 to 500 μm, and a length in the transverse direction of each of the recessed or protruding streaks being in a range of 50 to 200 μm.

29. A sealing device comprising:

an annular piston accommodated in an annular accommodation chamber for defining an annular fluid chamber in the annular accommodation chamber; and a plurality of sealing members, the plurality of sealing members including an inner and outer sealing members being provided in the annular piston, each of the inner and outer sealing member including an annular sliding contact portion which forms an annular seal lip and is brought into sliding contact with a peripheral surface of the annular accommodation chamber, a plurality of streaks, which are independent of one another, provided side by side so as to constitute a plurality of columns on a surface of the annular seal lip at least one of the inner and outer sealing members, the plurality of streaks including a plurality of recessed streaks in which a hydraulic fluid is stored or a plurality of protruding streaks around which the hydraulic fluid is stored, the recessed or protruding streaks of each of the columns being spaced side by side in a circumferential direction of the annular seal lip, the columns being spaced side by side in an axial direction of the annular seal lip, a longitudinal direction of each of the recessed or S protruding streaks being in the circumferential direction of the annular seal lip, a transverse direction of each of the recessed or protruding streaks being in the axial direction of the annular seal lip, a length in the longitudinal direction of each of the recessed or protruding streaks being in a range of 100 to 500 μm, and a length in the transverse direction of each of the recessed or protruding streaks being in a range of 50 to 200 μm.

30. The sealing device of claim 29, wherein
the recessed or protruding streaks constituting the adjacent columns are alternately arranged.

31. The sealing device of claim 29, further comprising
an annular partition plate for defining an annular back pressure chamber for applying back pressure to the annular piston, the plurality of sealing members including an annular sealing member provided on at least the outer periphery of the partition plate, the annular sealing member provided on the at least outer periphery of the partition plate including an annular sliding contact portion which forms a second annular seal lip and is brought into sliding contact with a peripheral surface of the annular piston, a plurality of streaks, which are independent of one another, being provided side by side so as to constitute a plurality of columns on a surface of the second annular seal lip, the plurality of streaks including a plurality of recessed streaks in which a hydraulic fluid is stored or a plurality of protruding streaks around which the hydraulic fluid is stored, the recessed or protruding streaks of each of the columns being spaced side by side in a circumferential direction of the second annular seal lip, the columns being spaced side by side in an axial direction of the second annular seal lip, the recessed or protruding streaks which are adjacent to each other in the circumferential direction of the second annular seal lip being alternately inclined in opposite directions in the circumferential direction of the second annular seal lip, the recessed or protruding streaks which are adjacent to each other in the axial direction of the second annular seal lip being inclined in same directions relative to the circumferential direction of the second annular seal lip, a length in the longitudinal direction of each of the recessed or protruding streaks being in a range of 100 to 500 μm, and a length in the transverse direction of each of the recessed or protruding streaks being in a range of 50 to 200 μm.

32. The sealing device of claim 31, wherein
the recessed or protruding streaks constituting the adjacent columns on the surface of the second annular seal lip are alternately arranged.

33. A sealing device comprising:

an annular piston accommodated in an annular accommodation chamber for defining an annular fluid chamber in the annular accommodation chamber; and a sealing member being provided in the annular piston,
the sealing member including an annular sliding contact portion which forms an annular seal lip and is brought into sliding contact with a predetermined peripheral surface of the annular accommodation chamber, and a plurality of streaks, which are independent of one another, provided side by side so as to constitute a plurality of columns on a surface of the annular seal lip, the plurality of streaks including a plurality of recessed streaks in which a hydraulic fluid is stored or a plurality of protruding streaks around which the hydraulic fluid is stored, the recessed or protruding streaks of each of the columns being spaced side by side in a circumferential direction of the annular seal lip, the columns being spaced side by side in an axial direction of the annular seal lip, a longitudinal direction of each of the recessed or protruding streaks being in the circumferential direction of the annular seal lip.

34. A sealing device comprising:

an annular piston accommodated in an annular accommodation chamber for defining an annular fluid chamber in the annular accommodation chamber; and a sealing member being provided in the annular piston,
the sealing member including an annular sliding contact portion which forms an annular seal lip and is brought into sliding contact with a predetermined peripheral surface of the annular accommodation chamber, and a plurality of streaks, which are independent of one another, provided side by side so as to constitute a plurality of columns on a surface of the annular seal lip, the plurality of streaks including a plurality of recessed streaks in which a hydraulic fluid is stored or a plurality of protruding streaks around which the hydraulic fluid is stored, a longitudinal direction of each of the recessed or protruding streaks being inclined in a circumferential direction of the annular seal lip, the recessed or protruding streaks of each of the columns being spaced side by side in the circumferential direction of the annular seal lip, the columns being spaced side by side in an axial direction of the annular seal lip, and a line extended in the longitudinal direction of each of the recessed or protruding streaks of each of the columns traversing a corresponding recessed or protruding streak of the adjacent columns so as to intersect a line in a longitudinal direction of the corresponding recessed or protruding streak.

35. A sealing device comprising:

an annular piston accommodated in an annular accommodation chamber for defining an annular fluid chamber in the annular accommodation chamber; and a plurality of sealing members, the plurality of sealing members including an inner and outer sealing members being provided in the annular piston, each of the inner and outer sealing member including an annular sliding contact portion which forms an annular seal lip and is brought into sliding contact with a peripheral surface of the annular accommodation chamber, a plurality of streaks, which are independent of one another, provided side by side so as to constitute a plurality of columns on a surface of the annular seal lip at least one of the inner and outer sealing members, the plurality of streaks including a plurality of recessed streaks in which a hydraulic fluid is stored or a plurality of protruding streaks around which the hydraulic fluid is stored, each of the recessed or protruding streaks being inclined in a circumferential direction of the annular seal lip, the recessed or protruding streaks of each of the columns being spaced side by side in the circumferential direction of the annular seal lip, the columns being spaced side by side in an axial direction of the annular seal lip, and a line extended in the longitudinal direction of each of the recessed or protruding streaks of each of the columns traversing a corresponding recessed or protruding streak of the adjacent columns so as to intersect a line in a longitudinal direction of the corresponding recessed or protruding streak.

36. The sealing device of claim 35, further comprising an annular partition plate for defining an annular back pressure chamber for applying back pressure to the annular piston, the plurality of sealing members including an annular sealing member provided on at least the outer periphery of the partition plate, the annular sealing member provided on the at least outer periphery of the partition plate including an annular sliding contact portion which forms a second annular seal lip and is brought into sliding contact with a peripheral surface of the annular piston, a plurality of streaks, which are independent of one another, being provided side by side so as to constitute a plurality of columns on a surface of the second annular seal lip, the plurality of streaks including a plurality of recessed streaks in which a hydraulic fluid is stored or a plurality of protruding streaks around which the hydraulic fluid is stored, a longitudinal direction of each of the recessed or protruding streaks on the second annular seal lip being inclined in a circumferential direction of the second annular seal lip, the recessed or protruding streaks of each of the columns being spaced side by side in the circumferential direction of the second annular seal lip, the columns being spaced side by side in an axial direction of the second annular seal lip, and a line extended in the longitudinal direction of each of the recessed or protruding streaks of each of the columns traversing a corresponding recessed or protruding streak of the adjacent columns so as to intersect a line in a longitudinal direction of the corresponding recessed or protruding streak.

* * * * *